United States Patent
Iyer et al.

(10) Patent No.: US 10,757,519 B2
(45) Date of Patent: Aug. 25, 2020

(54) NEURAL NETWORK-BASED PARAMETER ESTIMATION OF LOUDSPEAKERS

(71) Applicant: Harman International Industries, Inc., Stamford, CT (US)

(72) Inventors: Ajay Iyer, Murray, UT (US); Meenakshi Barjatia, Salt Lake City, UT (US)

(73) Assignee: Harman International Industries, Incorporated, Stamford, CT (US)

( * ) Notice: Subject to any disclaimer, the term of this patent is extended or adjusted under 35 U.S.C. 154(b) by 1221 days.

(21) Appl. No.: 15/051,452

(22) Filed: Feb. 23, 2016

(65) Prior Publication Data
US 2017/0243111 A1    Aug. 24, 2017

(51) Int. Cl.
*H04R 29/00* (2006.01)
*G06N 3/08* (2006.01)

(52) U.S. Cl.
CPC .......... *H04R 29/001* (2013.01); *G06N 3/084* (2013.01)

(58) Field of Classification Search
None
See application file for complete search history.

(56) References Cited

U.S. PATENT DOCUMENTS

| | | | | |
|---|---|---|---|---|
| 2008/0037804 A1* | 2/2008 | Shmunk | ................... | H04R 3/04 381/96 |
| 2015/0201294 A1* | 7/2015 | Risberg | ................... | H04R 3/002 381/59 |
| 2015/0304772 A1* | 10/2015 | Risberg | ................... | H04R 3/007 381/55 |
| 2016/0098632 A1* | 4/2016 | Sutskever | ............ | G06N 3/0445 706/25 |
| 2017/0103308 A1* | 4/2017 | Chang | ...................... | G06N 3/04 |

OTHER PUBLICATIONS

Birkett, A. Neil, and Rafik A. Goubran. "Acoustic echo cancellation using NLMS-neural network structures." 1995 International Conference on Acoustics, Speech, and Signal Processing. vol. 5. IEEE, 1995. (Year: 1995).*

Choi, Jaewon, and Michael D. Bryant. "Diagnostics of Mechanical Faults of Loudspeakers Using Principal Component Analysis and Fisher's Discriminant Analysis." ASME 2011 Dynamic Systems and Control Conference . American Society of Mechanical Engineers Digital Collection, 2011. (Year: 2011).*

(Continued)

*Primary Examiner* — Daniel T Pellett
(74) *Attorney, Agent, or Firm* — Artegis Law Group, LLP

(57) ABSTRACT

A technique for estimating a set of parameter values for a lumped parameter model of a loudspeaker. The technique includes determining, via a neural network model, a first set of parameter values for the LPM of the loudspeaker based on an audio input signal and a first measured response of a loudspeaker that corresponds to the audio input signal. The technique further includes generating a first LPM response based on the first set of parameter values and comparing the first LPM response to the first measured response of the loudspeaker to determine a first error value. The technique further includes generating, via the neural network model, a second set of parameter values for the LPM of the loudspeaker based on the first error value.

20 Claims, 5 Drawing Sheets

(56) References Cited

OTHER PUBLICATIONS

Bai, Mingsian R., and Chau-Min Huang. "Expert diagnostic system for moving-coil loudspeakers using nonlinear modeling." The Journal of the Acoustical Society of America 125.2 (2009): 819-830. (Year: 2009).*

Bai, Mingsain R., Ching-Yu Liu, and Rong-Liang Chen. "Optimization of microspeaker diaphragm pattern using combined finite element-lumped parameter models." IEEE Transactions on Magnetics 44.8 (2008): 2049-2057. (Year: 2008).*

* cited by examiner

NEURAL NETWORK-BASED PARAMETER ESTIMATION OF LOUDSPEAKERS

BACKGROUND

Field of the Invention

The various embodiments relate generally to analyzing loudspeaker systems and, more specifically, to neural network-based parameter estimation for a lumped parameter model of a loudspeaker.

Description of the Related Art

Modeling the behavior of loudspeakers is a common step when designing and manufacturing an audio system. For example, a manufacturer may collect data for a loudspeaker once it reaches the end of a factory line in order to model the specific behavior and characteristics of the loudspeaker. The resulting model may then be implemented in a control system that corrects for linear and/or non-linear distortion of the loudspeaker, enabling a desired loudspeaker response to be achieved.

One well-known type of model that is oftentimes employed in loudspeaker control systems is the lumped parameter model. In general, the lumped parameter model of a loudspeaker includes values for a set of parameters that, together, approximate the behavior of the loudspeaker. The parameters and corresponding values used in the lumped parameter model reflect simplifying assumptions, such as a piston-like motion of the loudspeaker diaphragm, that enable simplified mathematical modeling of the components within the loudspeaker and, consequently, more efficient simulation of the loudspeaker.

In general, generating a lumped parameter model based on loudspeaker data collected at the end of a factory line enables the loudspeaker control system to accurately achieve a desired loudspeaker response. However, the accuracy of a lumped parameter model generated for a given loudspeaker can decrease over the useful life of the loudspeaker due to various physical changes that affect the loudspeaker components over time as a result of heating effects, wear and tear, etc. For example, materials used in the suspension of a loudspeaker can deteriorate with time and/or the electrical characteristics of a loudspeaker voice coil can change, causing the response of the loudspeaker to an input signal to differ substantially from the response predicted by a lumped parameter model for that input signal. In such a situation, the values assigned to parameters included in the lumped parameter model of the speaker no longer accurately reflect the mechanical and electrical characteristics of the loudspeaker; therefore, the lumped parameter model is unable to accurately capture the actual behavior of the loudspeaker.

As the foregoing illustrates, more effective techniques for estimating, over time, parameter values for lumped parameter models of loudspeakers would be useful.

SUMMARY

Embodiments of the present disclosure set forth a computer-implemented method for estimating a set of parameter values for a lumped parameter model of a loudspeaker. The method includes determining, via a neural network model, a first set of parameter values for the LPM of the loudspeaker based on an audio input signal and a first measured response of a loudspeaker that corresponds to the audio input signal. The method further includes generating a first LPM response based on the first set of parameter values and comparing the first LPM response to the first measured response of the loudspeaker to determine a first error value. The method further includes generating, via the neural network model, a second set of parameter values for the LPM of the loudspeaker based on the first error value.

Further embodiments provide, among other things, a system and a non-transitory computer-readable medium configured to implement the method set forth above.

At least one advantage of the disclosed techniques is that a neural network is implemented to provide real-time estimates of lumped parameter model (LPM) values with a high degree of accuracy. Accordingly, the neural network-based approach described herein is able to accurately estimate and update LPM values to account for changes to various physical properties of the loudspeaker that may occur over time due to effects such as thermal variations and suspension aging.

BRIEF DESCRIPTION OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

DETAILED DESCRIPTION

In the following description, numerous specific details are set forth to provide a more thorough understanding of the embodiments of the present disclosure. However, it will be apparent to one of skill in the art that the embodiments of the present disclosure may be practiced without one or more of these specific details.

Loudspeaker Parameter Estimation System

Figure 1:
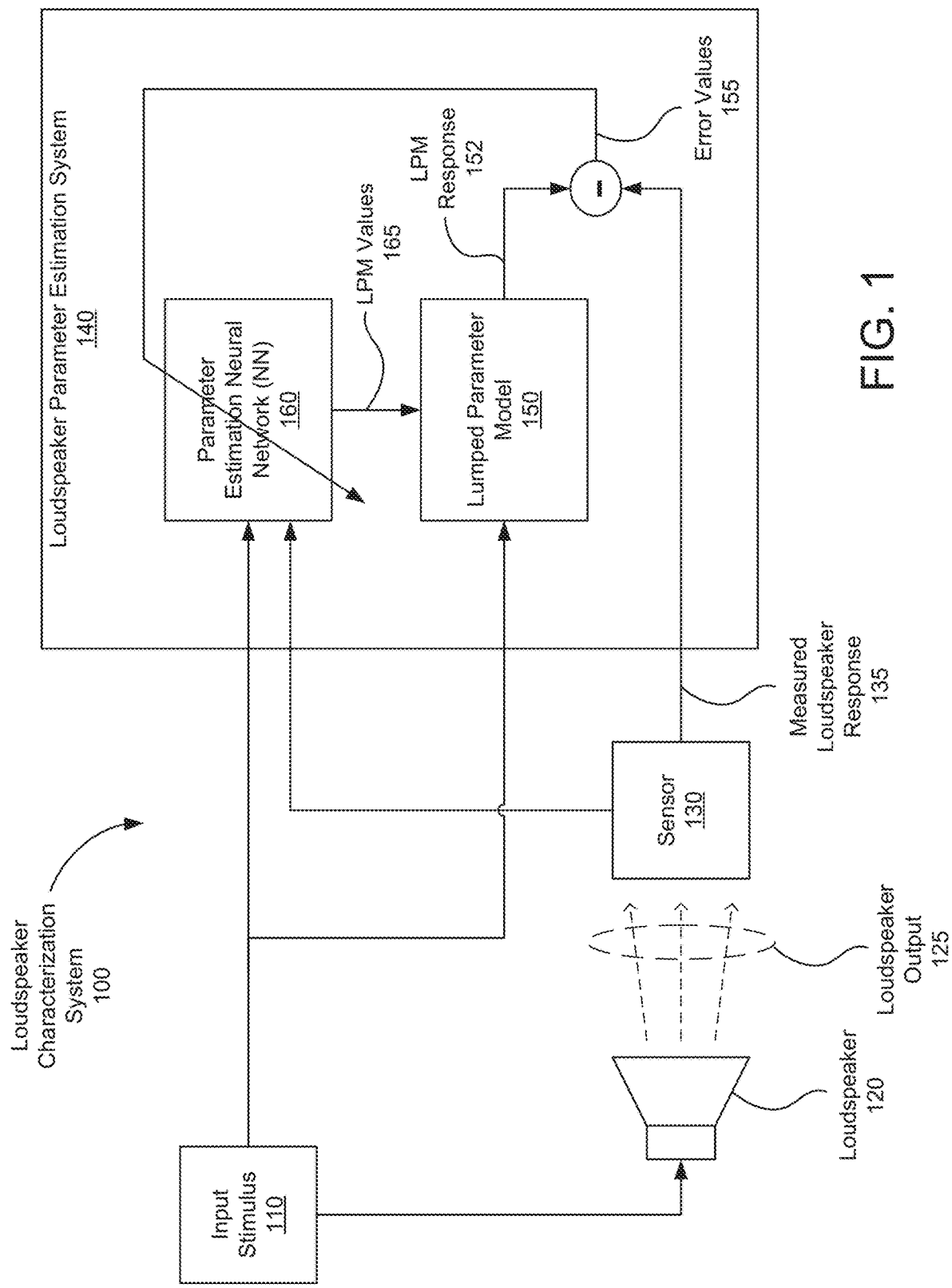
FIG. 1 illustrates a loudspeaker characterization system configured to implement one or more aspects of the various embodiments.

FIG. 1 illustrates a loudspeaker characterization system 100 configured to implement one or more aspects of the various embodiments. As shown, the loudspeaker characterization system 100 includes, without limitation, an input stimulus 110, a loudspeaker 120, a sensor(s) 130, and a loudspeaker parameter estimation system 140. As also shown, the loudspeaker parameter estimation system 140 includes a lumped parameter model 150 and a parameter estimation neural network (NN) 160. Notably, the loudspeaker parameter estimation system 140 is configured to estimate the parameter values for a lumped parameter model (LPM) of a loudspeaker 120 more reliably and more accurately than conventional approaches to parameter value estimation. Additionally, the loudspeaker parameter estimation system 140 is able to determine and update parameter values in real-time, during operation of the loudspeaker 120.

The loudspeaker 120 transforms the input stimulus 110 (e.g., an audio signal) into loudspeaker output 125. The loudspeaker 120 may be implemented in any technically feasible fashion. For example, and without limitation, in some embodiments the loudspeaker 120 may be a cone loudspeaker, a dome loudspeaker, a horn loudspeaker, or a planar loudspeaker (e.g., electrostatic loudspeaker).

The sensor(s) 130 transform the loudspeaker output 125 into a measured loudspeaker response 135. The measured loudspeaker response 135 may include an electrical signal that represents one or more characteristics of the loudspeaker output 125, such as the amplitude, phase, frequency response, sound pressure level (SPL), etc. of the loudspeaker output 125. For example, and without limitation, the sensor(s) 130 may include a microphone, and the measured loudspeaker response 135 may include an audio signal. In some embodiments, the sensor(s) 130 are configured to measure current through a voice coil of the loudspeaker 120 or the displacement of a cone included in the loudspeaker 120.

As shown, the input stimulus 110 is an input to both the lumped parameter model 150 and the parameter estimation neural network 160. Since the lumped parameter model 150 is used for nonlinear modeling of the loudspeaker 120, fully characterizing the behavior of the loudspeaker 120 may be difficult via a single type of stimulus. For instance, and without limitation, if a single sine tone (frequency f) were used as input to a nonlinear system, then the output would contain the harmonic frequencies (2*f, 3*f, 4*f, so on). By contrast, and without limitation, if two tones (frequencies $f_1$ and $f_2$) were used as the input stimulus 110, then the output would contain the sum and difference of those frequencies (i.e., $f_1+f_2$, $f_1+2*f_2$, $f_1-f_2$, $f_1-2*f_2$, ...) and the individual harmonic frequencies (i.e., $2*f_1$, ... and $2*f_2$, $3*f_2$, ...). Consequently, in order to more completely capture the full nonlinear behavior of the lumped parameter model 150, the input stimulus 110 may include a combination of different stimuli. For example, and without limitation, in some embodiments, the input stimulus 110 may include different types and levels of music, square waves, Farina sweeps, multi-tones (e.g., two or more tones), pink noise, or any combination thereof.

The lumped parameter model 150 models the behavior of the loudspeaker 120 in response to the input stimulus 110. The lumped parameter model 150 may be defined in any technically feasible fashion and may include any number and type of parameters that are consistent with the definition of the lumped parameter model 150. For example, in some embodiments, without limitation, the parameters used in the lumped parameter model 150 may include: coefficients of force factor $Bl(x)$, stiffness $K_{ms}(x)$, and voice coil inductance $L_e(x)$ polynomials; cone surface area $S_d$; mechanical resistance $R_{ms}$; voice coil DC resistance $R_e$; total moving mass $M_{ms}$; para-inductance $L_2(x)$; para-resistance $R_2(x)$; and flux modulation $L_e(i)$. The equations shown below describe non-limiting examples of parameters that may be included in the lumped parameter model 150 in various embodiments.

Figure 2A:
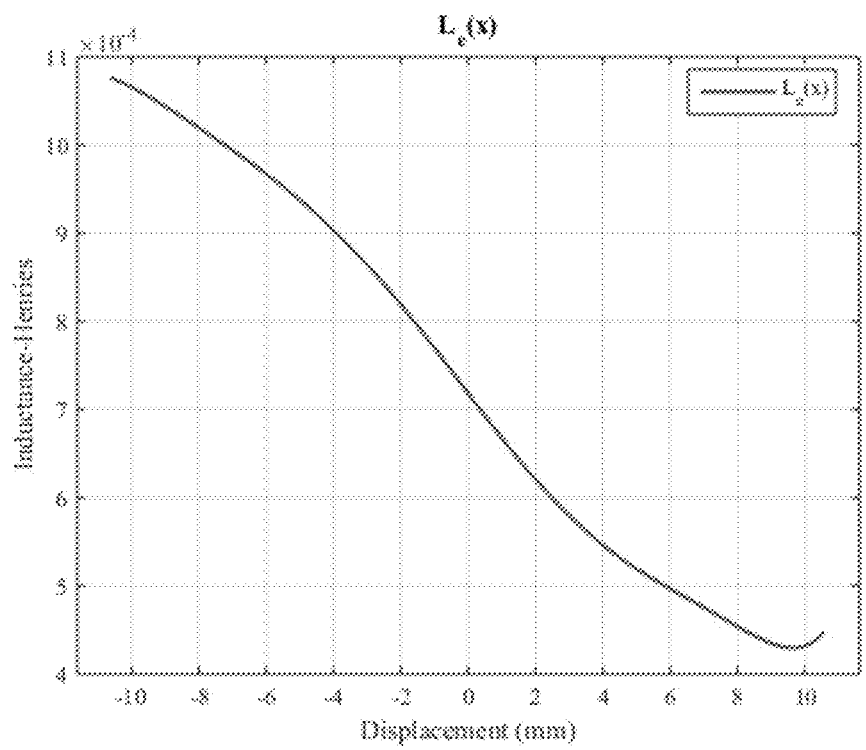
FIG. 2A illustrates the inductance of a voice coil as a function of the displacement of a loudspeaker diaphragm, according to various embodiments.
Figure 2B:
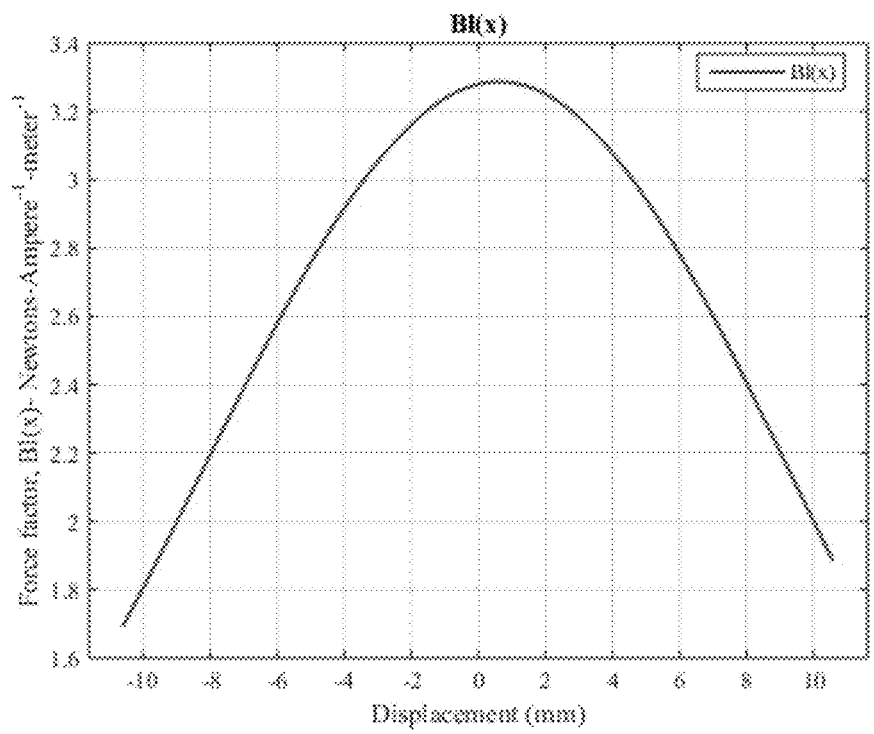
FIG. 2B illustrates a force factor as a function of the displacement of a loudspeaker diaphragm, according to various embodiments.

In particular, Equation 1 illustrates the input stimulus 110 $u(t)$ (e.g., a voltage) as a function of the current $i(t)$, where $R_{vc}$ the direct current (DC) resistance of the loudspeaker 120 voice coil, $L_e(x)$ is the inductance of the voice coil, $L_e(i)$ is the modulation of the voice coil inductance as a function of the voice coil current, $L_2(x)$ is the parasitic inductance of the voice coil, v is the velocity of the voice coil, and $Bl(x)$ is a force factor. In addition, FIG. 2A illustrates the inductance Le of the voice coil as a function of displacement x of the loudspeaker 120 diaphragm, and FIG. 2B illustrates the force factor Bl as a function of displacement x of the loudspeaker 120 diaphragm.

$$u(t) = iR_{vc} + \frac{d(iL_e(x, i))}{dt} + \frac{d(i_2 L_2(x, i))}{dt} + Bl(x)v \quad \text{(Eq. 1)}$$

Figure 2C:
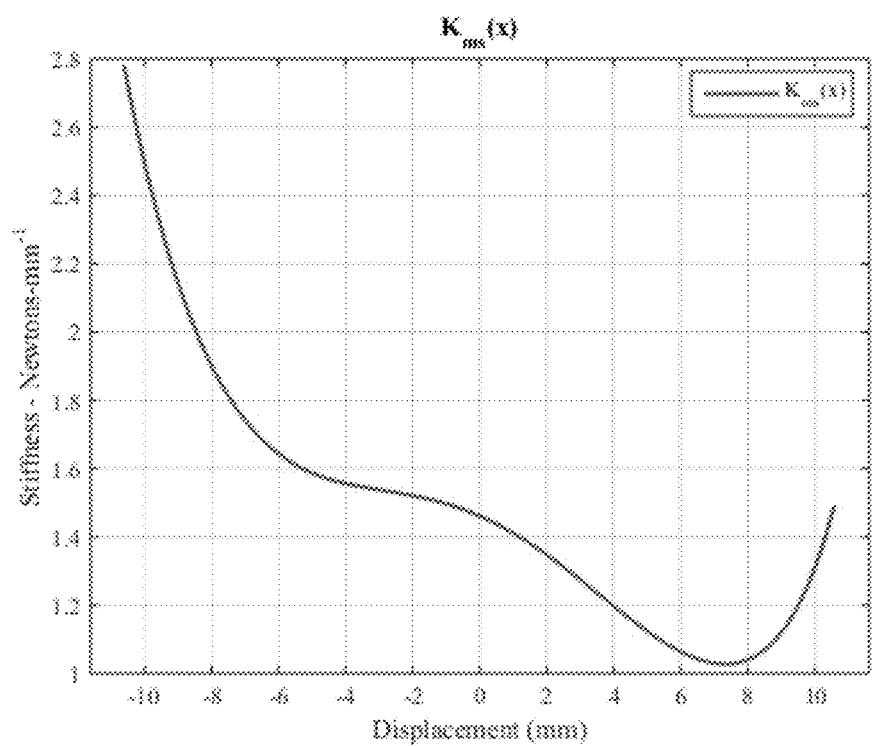
FIG. 2C illustrates the stiffness of a loudspeaker diaphragm as a function of the displacement of the loudspeaker diaphragm, according to various embodiments.

Equation 2 illustrates the displacement x(t) of the loudspeaker 120 diaphragm, where $R_{ms}$ is the mechanical resistance, $K_{tot}$ is the stiffness of loudspeaker 120 diaphragm, $M_{tot}$ is the total mass of the diaphragm, voice coil assembly, and the air in front of the loudspeaker 120 cone, and $Fm(x,i,i_2)$ is the reluctance force calculated in Equation 3. In addition, FIG. 2C illustrates the stiffness K of the loudspeaker 120 diaphragm as a function of displacement x of the loudspeaker 120 diaphragm.

$$Bl(x)i = vR_{ms} + K_{tot}(x)x + M_{tot}\frac{dv}{dt} + F_m(x, i, i_2) \quad \text{(Eq. 2)}$$

$$F_m(x, i, i_2) = -\frac{i^2}{2}\frac{\partial(L_e(x, i))}{\partial x} - \frac{i_2^2}{2}\frac{\partial(L_2(x, i))}{\partial x} \quad \text{(Eq. 3)}$$

Equation 4 illustrates the output pressure p(t) of the loudspeaker 120, disregarding the pressure response of the room in which the loudspeaker 120 is located. In some embodiments, the LPM response 152 calculated by the loudspeaker parameter estimation system 140 is equal to (or is based on) the output pressure p(t).

$$p(t) = \frac{d^2(x(t))}{dt^2} \quad \text{(Eq. 4)}$$

As discussed above, the lumped parameter model of a loudspeaker represents the response of the loudspeaker to an input stimulus. However, the response of a loudspeaker generally changes over time due to heating effects, wear and tear, etc. Consequently, although estimating parameters values for a lumped parameter model can help in designing, testing, and correcting linear and non-linear distortion of a loudspeaker, these parameter values may not accurately reflect the behavior of the loudspeaker as the characteristics of loudspeaker components change over time.

Neural Network-Based Parameter Value Estimation

In view of these shortcomings of conventional approaches, in various embodiments, the parameter estimation neural network 160 generates LPM values 165 in real-time to enable the lumped parameter model 150 to accurately model the input/output behavior of the loudspeaker 120. For example, and without limitation, once a set of LPM values 165 has been assigned to the lumped parameter model 150, the lumped parameter model 150 can process an input stimulus 110 based on the LPM values 165 to generate an LPM response 152 that approximates the measured loudspeaker response 135. The LPM response 152 is then compared to the measured loudspeaker response 135 to generate an error value 155, which is passed to the parameter estimation neural network 160 to generate updated LPM values 165. The updated LPM values 165 are then passed to the lumped parameter model 150, improving the accuracy with which the lumped parameter model 150 models the nonlinear input/output behavior of the loudspeaker 120. This process of training the parameter estimation neural network 160 to generate accurate LPM values 165 may be performed in real-time and/or over a series of training iterations, as described below in further detail. Accordingly, the response of the loudspeaker 120 can be accurately modeled even as the physical characteristics of loudspeaker 120 components change (e.g., due to aging).

As shown in FIG. 1, the parameter estimation neural network 160 accepts as inputs the input stimulus 110 and the measured loudspeaker response 135. The measured loudspeaker response 135 can be one or more of a voice coil current, a cone displacement, a pressure produced by the loudspeaker 120, or any other technically feasible value that is indicative of loudspeaker 120 operation. The loudspeaker parameter estimation system 140 then trains the parameter estimation neural network 160 in order to estimate a set of LPM values 165 that accurately map the input stimulus 110 to the measured loudspeaker response 135.

Next, the parameter estimation neural network 160 passes the initial estimated LPM values 165 to the lumped parameter model 150, which generates an LPM response 152 based on the input stimulus and the LPM values 165. The LPM response 152 generated by the lumped parameter model 150 is then compared to the measured loudspeaker response 135 to generate one or more error values 155. The error value(s) 155 are then passed to the parameter estimation neural network 160 in order to train the parameter estimation neural network 160 and generate updated LPM values 165. Notably, as the parameter estimation neural network 160 continues to process different input stimulus 110, measured loudspeaker responses 135, and error values 155, the parameter estimation neural network 160 "learns," iteratively modifying the LPM values 165 and, thereby, improving the mapping between the input stimulus 110 and the measured loudspeaker response 135.

In various embodiments, training the parameter estimation neural network 160 includes minimizing the error value(s) 155 between each LPM response 152 and the corresponding measured loudspeaker response 135. For example, and without limitation, the neural network (NN) parameters $\theta_{NN}$ of the parameter estimation neural network 160 could be updated at each step m using an iterative optimization technique (e.g., a gradient descent technique) that minimizes the error value(s) 155. A non-limiting example of a gradient descent technique for updating the NN parameters $\theta_{NN}$ to train the parameter estimation neural network 160 is shown below in Equation 5, where $\lambda$ is a regularization term that may be selected at each step and $\xi$ is an error criterion, such as a squared error criterion.

$$\theta_{NN}(m) = \theta_{NN}(m-1) - \lambda \frac{\partial \xi}{\partial \theta_{NN}}\bigg|_{\theta_{NN}=\theta_{NN}(m-1)} \quad \text{(Eq. 5)}$$

More specifically, as shown in Equation 5, at each step m, the rate of change of the error value 155 is determined (e.g., via least squares). The derivative of the rate of change is then calculated with respect to the NN parameters $\theta_{NN}$ to generate a gradient. Updated NN parameters $\theta_{NN}$ that reduce the error value 155 are then determined by descending the gradient towards a local or global minimum error value 155. Although a first-order gradient descent algorithm is shown above in Equation 5, in other embodiments, any other type of first-order or higher-order equation may be used to update the NN parameters $\theta_{NN}$ and train the parameter estimation neural network 160.

In some embodiments, for each step m, the previous NN parameters $\theta_{NN}$ may be updated based on a regularization term $\lambda$, as shown in Equation 5. The regularization term $\lambda$ may be selected based on one or more heuristics. In various embodiments, the regularization term $\lambda$ is initialized with a particular value that is reduced for each step m (e.g., $\lambda=0.99\lambda$) until the error value 155 falls below a threshold value. In other embodiments, the regularization term $\lambda$ could be a fixed value, and the NN parameters $\theta_{NN}$ may be updated at each step m until the error value 155 reaches a threshold value. Once the error value 155 falls below a threshold value, such as a percentage of the LPM response 152 and/or a percentage of the measured loudspeaker response 135, the LPM values 165 determined by the parameter estimation neural network 160 may not significantly change with additional steps m. Accordingly, under such circumstance, the regularization term $\lambda$ could be set to zero in order to stop updating the NN parameters $\theta_{NN}$ and/or training of the parameter estimation neural network 160 could be stopped to reduce processing requirements.

The parameter estimation neural network 160 may be implemented in any technically feasible fashion. For example, and without limitation, the parameter estimation neural network 160 could implement a cascade correlation neural network architecture, a recurrent cascade neural network architecture, a recurrent neural network architecture, a MultiLayer Perceptron neural network architecture, or any other type of artificial learning architecture. Further, the parameter estimation neural network 160 may "learn" in any manner that is consistent with the neural network architecture implemented by the parameter estimation neural network 160. For example, and without limitation, the parameter estimation neural network 160 could be configured to minimize a least squares error cost function.

In some embodiments, the loudspeaker parameter estimation system 140 trains multiple parameter estimation neural networks 160 and then selects the parameter estimation neural network 160 that minimizes the error value(s) 155 outputted by the lumped parameter model 150. Further, in some embodiments, each of the parameter estimation neural networks 160 may be based on a different neural network architecture.

Figure 3:
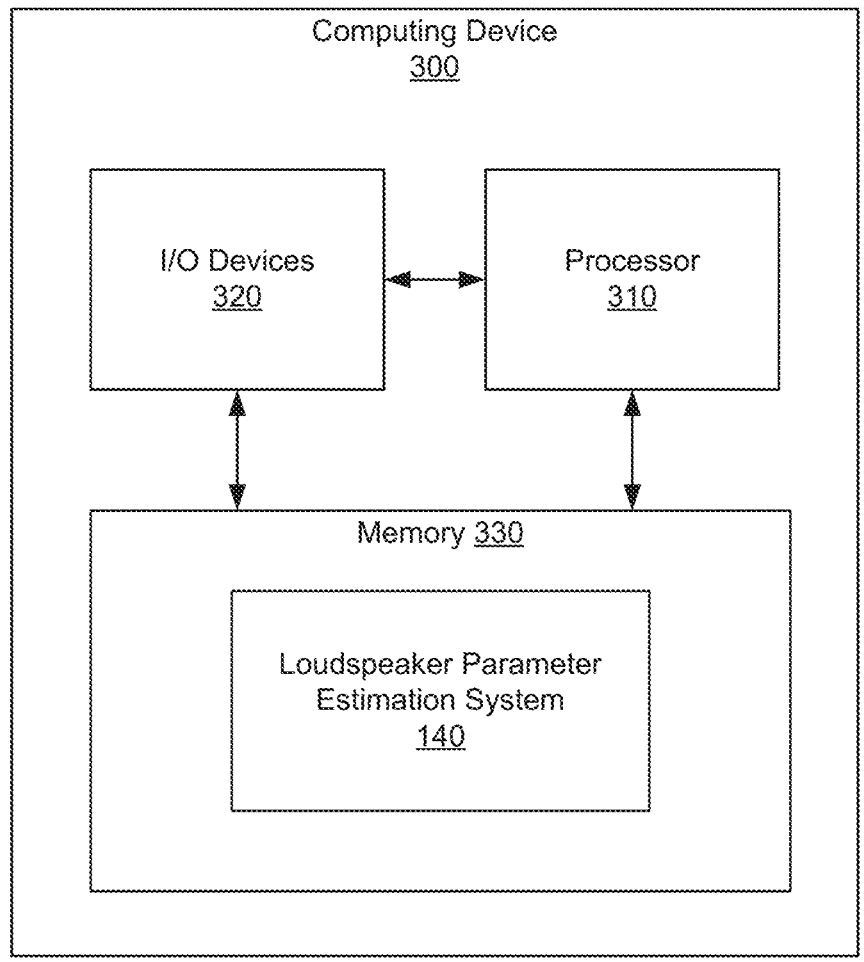
FIG. 3 illustrates a computing device configured to implement one or more aspects of the loudspeaker parameter estimation system of FIG. 1, according to various embodiments.

FIG. 3 illustrates a computing device 300 configured to implement one or more aspects of the loudspeaker parameter estimation system 140 of FIG. 1, according to various embodiments. The computing device 300 may be any type of device capable of executing application programs including, and without limitation, the loudspeaker parameter estimation system 140. For example, and without limitation, the computing device 300 may be a laptop, a tablet, a smartphone, etc. As shown, the computing device 300 includes, without limitation, a processor 310, input/output (I/O) devices 320, and a memory 330.

The processor 310 may be implemented as a central processing unit (CPU), a graphics processing unit (GPU), an application-specific integrated circuit (ASIC), a field-programmable gate array (FPGA), and so forth. Among other things, and without limitation, the processor 310 executes the parameter estimation neural network 160 and/or the lumped parameter model 150 to generate LPM values 165 and LPM response(s) 152, respectively. The processor 310 may further be configured to compare the LPM response(s) 152 to the measure loudspeaker response(s) 135 to determine one or more error values 155.

The I/O devices 320 may include input devices, output devices, and devices capable of both receiving input (e.g., input stimulus 110, measured loudspeaker response 135, etc.) and providing output (e.g., LPM values 165, error values 155, etc.). The memory 330 may include a memory module or a collection of memory modules. As shown, the loudspeaker parameter estimation system 140 may include an application stored in the memory 330.

The computing device 300 may be implemented as a stand-alone chip, such as a microprocessor, or as part of a more comprehensive solution that is implemented as an application-specific integrated circuit (ASIC), a system-on-a-chip (SoC), and so forth. Generally, the computing device 300 may be configured to coordinate the overall operation of a computer-based system, such as the loudspeaker characterization system 100. In other embodiments, the computing device 300 may be coupled to, but separate from the computer-based system. In such embodiments, the computer-based system may include a separate processor that transmits data, such as the input stimulus 110, to the computing device 300, which may be included in a consumer electronic device, such as a personal computer, and the like. However, the embodiments disclosed herein contemplate any technically feasible system configured to implement the functionality associated with various components of the loudspeaker parameter estimation system 140, in any combination.

Figure 4:
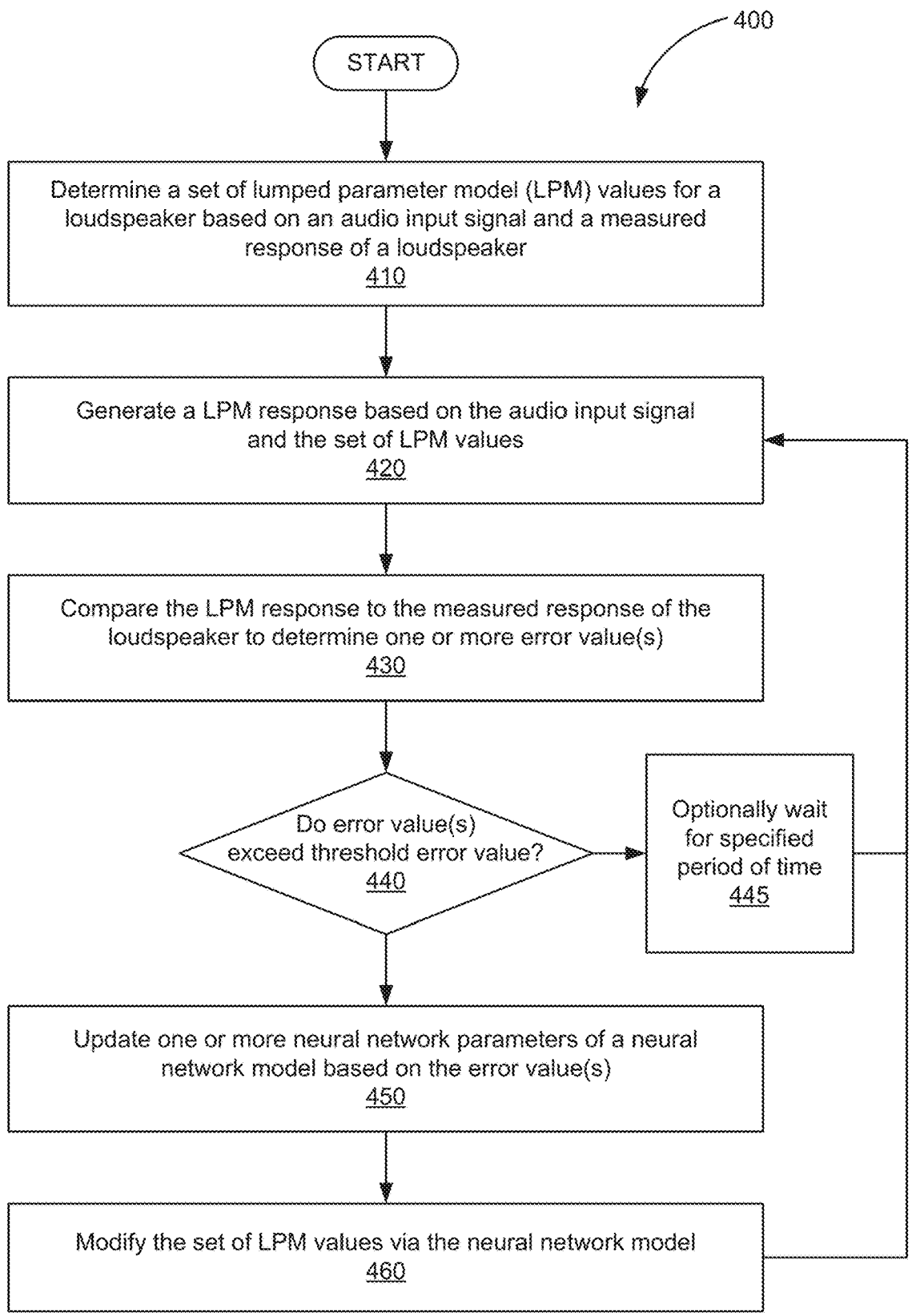
FIG. 4 is a flow diagram of method steps for estimating parameter values for a lumped parameter model of a loudspeaker, according to various embodiments.

FIG. 4 is a flow diagram of method steps for estimating parameter values for a lumped parameter model (LPM) of a loudspeaker, according to various embodiments. Although the method steps are described in conjunction with the systems of FIGS. 1-3, persons skilled in the art will understand that any system configured to implement the method steps, in any order, falls within the scope of the various embodiments.

As shown, a method 400 begins at step 410, where the loudspeaker parameter estimation system 140 determines a set of LPM values 165 for the loudspeaker 120 based on the input stimulus 110 and a measured loudspeaker response 135. Specifically, in some embodiments, the parameter estimation neural network 160 generates a nonlinear mapping between the input stimulus 110 and the measured loudspeaker response 135. The LPM values 165 are then determined based on the nonlinear mapping. At step 420, the loudspeaker parameter estimation system 140 inputs the LPM values 165 into the lumped parameter model 150 and generates an LPM response 152 based on the input stimulus 110.

At step 430, the loudspeaker parameter estimation system 140 compares the LPM response 152 to the measured loudspeaker response 135 to determine one or more error values 155. Then, at step 440, the loudspeaker parameter estimation system 140 determines whether the error value(s) 155 exceed a threshold error value. In various embodiments, the threshold error value may be a fixed value or a percentage (e.g., 0%, 1%, 5%, etc.) of the input stimulus 110 or the measured loudspeaker response 135. Additionally or alternatively, at step 440, the loudspeaker parameter estimation system 140 could determine whether the error value(s) 155 have stabilized. For example, at step 440, in addition to (or instead of) determining whether the error value(s) 155 exceed a threshold error value, the loudspeaker parameter estimation system 140 could determine whether the error value(s) 155 have remained within a pre-determined boundary for the last three to five iterations of steps 420 through 460.

If the error value(s) 155 exceed the threshold error value, then the method 400 proceeds to step 450, where the loudspeaker parameter estimation system 140 trains the parameter estimation neural network 160 based on the error value(s) 155, the input stimulus 110, and/or the measured loudspeaker response 135. In some embodiments, training the parameter estimation neural network 160 includes updating one or more NN parameters $\theta_{NN}$ based on a least squares and/or a gradient descent technique, as described above.

After the current training iteration of the parameter estimation neural network 160 is complete, the method 400 proceeds to step 460, where an updated set of LPM values 165 is generated via the parameter estimation neural network 160 in order to more accurately map the input stimulus 110 to the measured loudspeaker response 135. The method 400 then returns to step 420, where an additional input stimulus 110 and measured loudspeaker response 135 are acquired to determine an additional LPM response 152 and error value 155.

Returning to step 440, if the error value(s) 155 do not exceed the threshold error value and/or the error value(s) 155 have stabilized (e.g., for several iterations of step 440), then the method 400 proceeds to step 445, where execution of the loudspeaker parameter estimation system 140 or the parameter estimation neural network 160 is paused for a specified period of time. For example, and without limitation, if the error value(s) 155 fall below the threshold error value, then execution of the parameter estimation neural network 160 could be temporarily terminated in order to conserve processing resources. Then, after the specified period of time, the method 400 returns to steps 420, 430, and 440 to determine whether the error value(s) 155 are still below the threshold error value.

In sum, the loudspeaker parameter estimation system determines a lumped parameter model (LPM) response based on a set of LPM parameter values and an input stimulus. The loudspeaker parameter estimation system then determines an error value based on a difference between the LPM response and a measured loudspeaker response associated with the input stimulus. The error value is then passed to a parameter estimation neural network in order to train the parameter estimation neural network. Once the current training iteration is complete, the parameter estimation neural network determines an updated set of LPM values and passes the updated LPM values to the lumped parameter model. One or more additional iterations of determining an additional LPM response and corresponding error value may then be performed to further train the parameter estimation neural network and update the LPM values.

At least one advantage of the disclosed techniques is that a neural network is implemented to provide real-time estimates of lumped parameter model (LPM) values with a high degree of accuracy. Accordingly, the neural network-based approach described herein is able to accurately estimate and update LPM values to account for changes to various physical properties of the loudspeaker that may occur over time due to effects such as thermal variations and suspension aging.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. One or more non-transitory computer-readable storage media including instructions that, when executed by one or more processors, configure the one or more processors to estimate a set of parameter values for a lumped parameter model (LPM) of a loudspeaker, by performing steps of:
   determining, via a neural network model, a first set of parameter values for the LPM of the loudspeaker from an audio input signal and a first measured response of a loudspeaker that corresponds to the audio input signal;
   generating, via the LPM, a first LPM response from the audio input signal and the first set of parameter values;
   comparing the first LPM response to the first measured response of the loudspeaker to determine a first error value; and
   generating, via the neural network model, a second set of parameter values for the LPM of the loudspeaker based on the first error value.

2. The one or more non-transitory computer-readable storage media of claim 1, wherein the instructions further configure the one or more processors to perform a step of updating one or more neural network parameters of the neural network model based on the first error value, wherein the second set of parameter values is generated based on the one or more neural network parameters that have been updated.

3. The one or more non-transitory computer-readable storage media of claim 2, wherein the instructions further configure the one or more processors to perform steps of:
   generating a second LPM response based on the second set of parameter values;
   comparing the second LPM response to a second measured response of the loudspeaker to determine a second error value; and
   generating, via the neural network model, a third set of parameter values for the LPM of the loudspeaker based on the second error value.

4. The one or more non-transitory computer-readable storage media of claim 3, wherein the instructions further configure the one or more processors to perform steps of:
   determining a rate of change based on the first error value and the second error value; and
   prior to generating the third set of parameter values, updating the one or more neural network parameters of the neural network model based on the rate of change.

5. The one or more non-transitory computer-readable storage media of claim 4, wherein the one or more neural network parameters are updated based on a gradient descent algorithm.

6. The one or more non-transitory computer-readable storage media of claim 1, wherein the instructions further configure the one or more processors to perform steps of:
   generating a second LPM response based on the second set of parameter values;

comparing the second LPM response to a second measured response of the loudspeaker to determine a second error value;
determining that the second error value is below a threshold error value; and
in response, terminating execution of the neural network model for a specified period of time.

7. The one or more non-transitory computer-readable storage media of claim 6, wherein the instructions further configure the one or more processors to perform steps of:
resuming execution of the neural network model after the specified period of time;
generating a third LPM response based on the audio input signal and the second set of parameter values;
comparing the third LPM response to a third measured response of the loudspeaker to determine a third error value;
determining that the third error value is above the threshold error value;
in response, updating one or more neural network parameters of the neural network model based on the third error value; and
generating, via the updated neural network model, a third set of parameter values for the LPM of the loudspeaker.

8. The one or more non-transitory computer-readable storage media of claim 6, wherein the second error value is based on a difference between the second LPM response and the second measured response of the loudspeaker, and the threshold error value comprises a predetermined percentage of one of the second LPM response or the second measured response of the loudspeaker.

9. The one or more non-transitory computer-readable storage media of claim 1, wherein the first measured response of the loudspeaker comprises at least one of a current through a voice coil of the loudspeaker, a displacement of a cone of the loudspeaker, or a sound pressure level.

10. A method for estimating a set of parameter values for a lumped parameter model (LPM) of a loudspeaker, the method comprising:
determining, via a neural network model, a first set of parameter values for the LPM of the loudspeaker from an audio input signal and a first measured response of a loudspeaker that corresponds to the audio input signal;
generating, via the LPM, a first LPM response from the audio input signal and the first set of parameter values;
comparing the first LPM response to the first measured response of the loudspeaker to determine a first error value;
training the neural network model based on the first error value, the audio input signal, and at least one measured response of the loudspeaker; and
generating, via the trained neural network model, a second set of parameter values for the LPM of the loudspeaker.

11. The method of claim 10, wherein training the neural network model comprises updating one or more neural network parameters based on the first error value, and the second set of parameter values is generated based on the one or more neural network parameters that have been updated.

12. The method of claim 10, further comprising, for each of a plurality of training iterations:
generating a LPM response based on a set of parameter values and the audio input signal;
comparing the LPM response to a measured response of the loudspeaker to determine an error value;
updating one or more neural network parameters of the neural network model based on the error value; and
modifying, via the updated neural network model, at least one parameter value included in the set of parameter values.

13. The method of claim 10, further comprising further training the neural network model by:
generating a second LPM response based on the second set of parameter values;
comparing the second LPM response to a second measured response of the loudspeaker to determine a second error value;
determining a rate of change based on the first error value and the second error value;
updating one or more neural network parameters of the neural network model based on the rate of change; and
generating, via the updated neural network model, a third set of parameter values for the LPM of the loudspeaker.

14. The method of claim 13, wherein the one or more neural network parameters are updated based on a gradient descent algorithm.

15. The method of claim 10, further comprising:
generating a second LPM response based on the second set of parameter values; and
comparing the second LPM response to a second measured response of the loudspeaker to determine a second error value.

16. A system for estimating a set of parameter values for a lumped parameter model (LPM) of a loudspeaker, the system comprising:
a memory storing a loudspeaker parameter estimation application; and
one or more processors that are coupled to the memory and, when executing the loudspeaker parameter estimation application, are configured to:
determine, via a neural network model, a first set of parameter values for the LPM of the loudspeaker from an audio input signal and a first measured response of a loudspeaker that corresponds to the audio input signal;
generate, via the LPM, a first LPM response from the audio input signal and the first set of parameter values;
train the neural network model based on the first LPM response and the first measured response of the loudspeaker; and
generate, via the trained neural network model, a second set of parameter values for the LPM of the loudspeaker.

17. The system of claim 16, wherein training the neural network model comprises computing an error value based on the first LPM response and the first measured response of the loudspeaker.

18. The system of claim 16, wherein the one or more processors are further configured to further train the neural network model by:
generating a second LPM response based on the second set of parameter values;
comparing the second LPM response to a second measured response of the loudspeaker to determine an error value;
determining that the error value exceeds a threshold error value;
in response, updating one or more neural network parameters of the neural network model; and generating, via the updated neural network model, a third set of parameter values for the LPM of the loudspeaker based on the one or more neural network parameters that have been updated.

19. The system of claim 18, wherein the one or more neural network parameters are updated based on a gradient descent algorithm.

20. The system of claim 16, wherein the first measured response of the loudspeaker comprises at least one of a current through a voice coil of the loudspeaker, a displacement of a cone of the loudspeaker, or a sound pressure level.

* * * * *